(12) United States Patent
Nathan (10) Patent No.: US 7,308,417 B1
(45) Date of Patent: Dec. 11, 2007

(54) METHOD FOR CREATING AND DISPLAYING A MULTI-DIMENSIONAL BUSINESS MODEL COMPARATIVE STATIC

(75) Inventor: Rick S. Nathan, Northbrook, IL (US)

(73) Assignee: Novell, Inc., Provo, UT (US)

( * ) Notice: Subject to any disclaimer, the term of this patent is extended or adjusted under 35 U.S.C. 154(b) by 867 days.

(21) Appl. No.: 10/206,377

(22) Filed: Jul. 26, 2002

Related U.S. Application Data (63) Continuation of application No. 09/934,087, filed on Aug. 21, 2001, now abandoned.

(60) Provisional application No. 60/275,062, filed on Mar. 12, 2001.

(51) Int. Cl.
*G06F 17/60* (2006.01)

(52) U.S. Cl. .......................... 705/10; 705/36

(58) Field of Classification Search .................. 705/10, 705/36 R
See application file for complete search history.

(56) References Cited

U.S. PATENT DOCUMENTS

| | | | | |
|---|---|---|---|---|
| 4,905,162 | A | * | 2/1990 | Hartzband et al. ............ 706/52 |
| 5,970,476 | A | * | 10/1999 | Fahey ......................... 705/28 |
| 6,088,718 | A | | 7/2000 | Altschuler et al. .......... 709/203 |
| 6,144,962 | A | | 11/2000 | Weinberg et al. ............. 707/10 |
| 6,175,838 | B1 | | 1/2001 | Papierniak et al. ......... 707/223 |
| 6,211,887 | B1 | | 4/2001 | Meier et al. ................. 345/440 |
| 6,212,509 | B1 | | 4/2001 | Pao et al. ..................... 706/16 |
| 6,232,984 | B1 | | 5/2001 | Chuah et al. ............... 345/441 |
| 6,282,532 | B1 | * | 8/2001 | Sandell .......................... 707/1 |
| 6,317,700 | B1 | * | 11/2001 | Bagne ........................ 702/181 |
| 6,363,353 | B1 | * | 3/2002 | Chen ........................... 705/10 |
| 6,417,852 | B2 | * | 7/2002 | Sevastyanov ............... 345/440 |
| 6,577,304 | B1 | * | 6/2003 | Yablonski et al. .......... 345/419 |
| 6,609,110 | B1 | * | 8/2003 | Dowd et al. .............. 705/36 R |
| 6,654,764 | B2 | * | 11/2003 | Kelkar et al. ............... 707/102 |
| 6,741,995 | B1 | * | 5/2004 | Chen et al. ................. 707/102 |

OTHER PUBLICATIONS

Marshall, Martin. Cognos to add PowerPlay server. Communications Week. Manhasset: Feb. 26, 1996. Iss. 598, p. 17. from proquest.*

* cited by examiner

*Primary Examiner*—Beth Van Doren
*Assistant Examiner*—Johnna Loftis
(74) *Attorney, Agent, or Firm*—Schwegman, Lundberg, Woessner, P.A.

(57) ABSTRACT

A systemic logic method is used to convert objective and subjective data into meaningful business information. A graphical representation is created to allow the rapid and efficient comparison of the data generated, enabling the business analyst or decision maker to make and/or support decisions. The invention may used to identify strengths, vulnerabilities or opportunities for a business.

17 Claims, 6 Drawing Sheets

METHOD FOR CREATING AND DISPLAYING A MULTI-DIMENSIONAL BUSINESS MODEL COMPARATIVE STATIC

RELATED APPLICATIONS

This application is a continuation of U.S. application Ser. No. 09/934,087, filed Aug. 21, 2001 which claims the benefit of U.S. Provisional Application No. 60/275,062, filed Mar. 12, 2001. The entire specifications of which are incorporated herein by reference.

FIELD OF THE INVENTION

The invention relates generally to a method for converting data into meaningful business information, allowing business strengths, vulnerabilities, or opportunities to be identified.

BACKGROUND OF THE INVENTION

Competitive organizations can be thought to exist in value producing, value exchanging, or value consuming states. A value producer is an organization whose strategic intent is to utilize factors of production, including people, process, technology, and financial capital, in order to create a product or service that is envisioned to provide utility and value to a third party. A value exchanger represents an organization that leverages its strengths in "brokering" relationships through sophisticated consultative services such as investment banking, or less complex efforts such as a directory provider of names, addresses, and telephone numbers. A value consumer is an organization that "destroys" value through its use, gaining some form of utility usually in exchange for cash or some payment in kind.

These states are not mutually exclusive. In other words, a manufacturer of industrial components can potentially occupy all three states: (i) value producing through raw material and labor conversion to finished product; (ii) value exchanging through an internal sales force or affiliated distribution network; and (iii) value consuming through the procurement of technology or materials required in the manufacturing process. The critical questions to be addressed are: should an organization occupy all three states, or two, or just one; and which of the states, how, and when?

Different organizations may have complementary core competencies. To the extent these can be effectively shared, an organization can form a strategic alliance with other organizations that demonstrate superior capabilities in given areas to leverage the assets or methods of the more value-producing organization. In so doing, the organization may actually have to remove a less efficient portion of its own value-producing process and replace it with an equivalent functionality provided by the organization with the superior capability. The organization may not have the luxury of not choosing this strategy because in a competitive environment a more nimble value-maximizing organization often supplants the inferior capabilities of a recalcitrant organization by providing better, cheaper, and faster products and services enabled by its superior capabilities. However, by examining business processes and identifying distinguishing core competencies, an organization can undertake an "as-is" versus "should-be" analysis, thereby identifying strengths and vulnerabilities in its organizational structures and plans. This information may then be used to enable the organization to create "best in class" business processes, products, and services.

Historically, organizations have employed ad-hoc methods to perform competitive analyses in order to understand their strengths, weaknesses, opportunities, and threats. Such analyses often incorporate both public domain and privately obtained information around such factors as product or service diversity, quality, price, support, distribution channels, and supply chain efficiencies, amongst a myriad of other organization and industry specific factors. As a result, the amount of information to be synthesized, including the choice of competitive factors, the relationship among the factors, and the subjective or objective value placed on these factors, presents an overwhelming challenge to the analyst in conveying meaningful and optimal conclusions.

What is needed is a reproducible and robust process that allows both business analysts and management decision makers alike to distill a compendium of complex information into a visualization that depicts the competitive state of the organization, thereby providing enhanced management decision direction and support. What is further needed is the ability to create visual surfaces depicting both a subject organization, its direct competitors, and third party complementary organizations, to enable the business manager to more readily optimize a selection of strategic partners, compare alternative business combination strategies, and refine its own competitive approach.

SUMMARY OF THE INVENTION

The preceding problems are addressed by the present invention, which in one aspect features a systemic logic method for converting subjective and objective data into meaningful business information. One or more Meta Categories are identified, which correspond, for example, to the major competitive parameters affecting a business organization. One or more subcategories that drive the value of each Meta Category are determined. A score is computed for each subcategory based on data that is collected, and a graphical representation of the scores for the subcategories is generated. In one embodiment of the invention, the raw score data is weighted and/or normalized, yielding an adjusted score for graphing. The graphical representation can be in the form of a spider graph.

In another embodiment of the invention, the above steps are repeated for two or more organizations. In this embodiment, the same Meta Categories and subcategories are used for each organization, allowing the resulting graphical representations to be effectively compared with each other. Further, the graphical representations for the different organizations can be overlayed on a common set of axes. In one embodiment, the overlayed graphical representations can utilize a complementary analysis technique. In another embodiment, a differences analysis technique is used.

In various embodiments of the invention, the data used to generate the scores for the subcategories can come from public or privately-available data. Subjective data can also be used.

In another aspect of the invention, one or more Meta Categories corresponding, for example, to the major competitive parameters affecting a business organization are identified. One or more subcategories that drive the value of each Meta Category are determined. A score is computed for each subcategory based on data that is collected. A graphical representation of the subcategories is created, by generating a graph for each Meta Category. These steps are performed for a plurality of organizations, using the same subcategories and Meta Categories for each of them. The graphical representations are then compared on a common set of axes, utilizing a complementary or differences analysis technique.

In one embodiment of the invention, the score to be graphed is weighted and normalized. In another embodiment, the multidimensional graphical representations are spider graphs.

In another aspect, the invention comprises a system for converting business data into business information. The system includes a user interface for inputting business data, Meta Categories, and subcategories. Memory in communication with the user interface stores the inputted information, and a processor in communication with the memory manipulates it, computing a score for each subcategory and generating a multidimensional graphical representation of the score for each subcategory of each Meta Category.

In one embodiment, the user interface comprises a monitor and a keyboard. In another embodiment, the multidimensional graphical representation is displayed on a monitor. The processor can weight and normalize the scores for the subcategories, and it can also generate a spider graphical representation of the score for each subcategory of each Meta Category.

In yet another embodiment, the system can be used to generate multidimensional graphical representations for a plurality of organizations, and these can be combined on a common set of axes. Further, the system can use a complementary or differences analysis technique to combine the multidimensional graphical representations for different organizations on a common set of axes.

Another aspect of the invention features a program storage device readable by a machine, which embodies instructions executable by a processor. These instructions perform a method that identifies one or more Meta Categories corresponding to business data, determines one or more subcategories within each Meta Category, computes a score for each subcategory, and generates a multidimensional graphical representation of the score for each subcategory of each Meta Category.

In one embodiment, the instructions of the program storage device weight and normalize the score. In another embodiment they generate a spider graph. In yet another embodiment, the instructions are performed for a plurality of organizations, using the same subcategories and Meta Categories for each organization, and the graphical results are compared on a common set of axes, using either a complementary or differences analysis technique.

Another aspect of the invention features an apparatus for converting business data into business information, comprising a first device for identifying Meta Categories, a second device for determining subcategories, a third device for computing subcategory scores, and a fourth device for generating multidimensional graphical representations of the score for each subcategory of each Meta Category.

In one embodiment the third device weights and normalizes the scores. In another embodiment the fourth device generates a spider graph. The apparatus can use a complementary or a differences analysis technique to compare business information for a plurality of organizations.

In another aspect, the invention includes a method for converting business data into business information, embodied on a program storage device. The method includes identifying one or more Meta Categories corresponding to business data, determining one or more subcategories within each Meta Category, computing a score for each subcategory, and generating a multidimensional graphical representation of the score of each subcategory of each Meta Category. These steps are performed for a plurality of organizations, using the same subcategories and Meta Categories for each organization, and the graphical representations are compared on a common set of axes using a complementary or differences analysis technique.

In another embodiment the scores are weighted and normalized for each subcategory. In yet another embodiment, the multidimensional graphical representations are spider graphs.

The invention offers several advantages over known techniques. For example, it replaces ad hoc analyses with a method that distills a compendium of complex information into a systematic and logical visualization of graphical information. The resulting graphical information illustrates the status of a business enterprise with respect to its goals, competitors, or potential strategic partners in a form that is practical and effectively enables the business analyst or decision maker to make and support decisions.

BRIEF DESCRIPTION OF THE DRAWINGS

These and other features of the invention are more fully described below in the detailed description and accompanying drawings, of which the figures illustrate an apparatus and method for converting objective and subjective data into meaningful business information.

DETAILED DESCRIPTION

Figure 1:
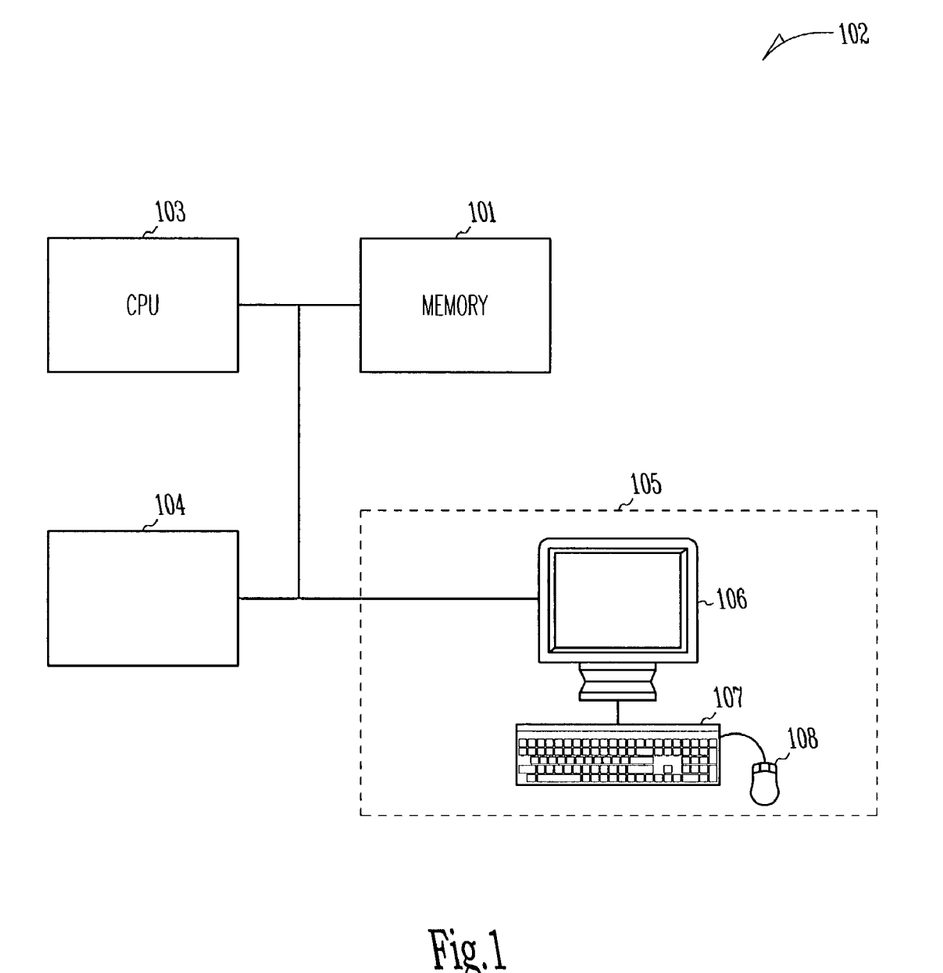
FIG. 1 shows an apparatus that can be used to perform the method of this invention.

The method of this invention is used for creating and displaying a multi-dimensional business model comparative static. The invention can be performed manually, or it can be automated, for example, with a computer. Use of a computer supports automation of the method. FIG. 1 shows an apparatus that can be used to perform the method of this invention.

In one embodiment, the method can be implemented by software in the memory 101 of a computer 102. A CPU 103 executes the software. The software can reside on a computer program storage device 104, such as, but not limited to, a floppy disk, a hard disk, an optical disk, a magnetic tape, a PROM, an EPROM, CD-ROM or DVD-ROM. The CPU 103 and memory 101 can reside in the computer 102 or can be remotely located over a large-scale communications network, such as the World Wide Web. A user interacts with the computer via a user interface 105, which can consist of a monitor 106, keyboard 107, and/or a mouse 108. The method can be performed by the computer 102, for example, based on information that is input via the user interface 105.

In an embodiment of the invention, portions of the method of the invention can be efficiently implemented by application software such as Microsoft Excel™, whereby information can be entered, manipulated, and/or graphed for display. Using these techniques the information can be processed and presented.

Figure 2:
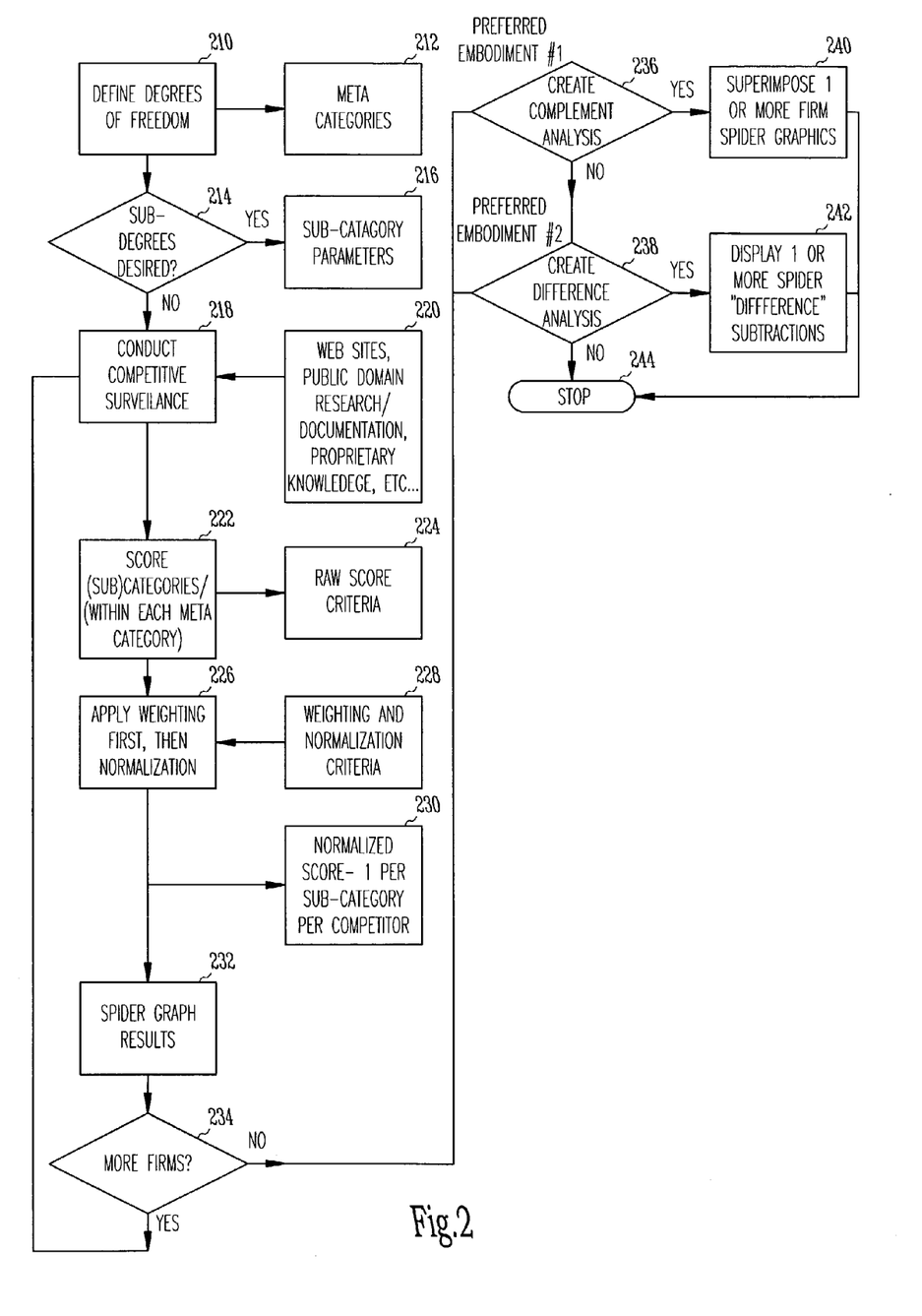
FIG. 2 shows a flow chart illustrating the method by which the present invention performs comparisons of competitive analyses.

FIG. 2 shows a flow chart illustrating the method by which the present invention performs comparisons of competitive analyses. The method can be used to perform comparisons of competitive analyses using a series of steps, but in some embodiments useful results may be achieved even with the omission of certain steps.

In one embodiment, the invention is used to compare the needs of one organization with the capabilities of another. Although the term "organization" is used throughout, the invention may be effectively applied to various firms, companies, business entities, enterprises, groups within an enterprise, and the like. Comparisons may be made between these various organizations to generate a type of complement analysis. First, it is necessary to determine the "degrees of freedom" (step 210). These include high-level, generalized factors relating to the major competitive parameters of the organization(s) being studied. They are listed based upon their impact to either the "as-is" or the "should-be" elements of the strategic intent of the subject organization. After careful consideration, selections are made from this list. Typical selection criteria can include metrics that relate to product or service cost, quality, cycle time (or speed), and value. These selections become the Meta Categories (step 212) that are used subsequently in the process.

Within each Meta Category, sub-degrees of freedom (step 214) can be specified and listed. These consist of the factors that most impact the Meta Categories selected above. "Subcategories" are selected from the list of sub-degrees of freedom that is generated, based upon their capacity as a driver of value for and their relation to a given Meta Category.

The same process may be repeated for any number of Meta Categories. It is not necessary to limit the evaluation technique to a certain number of Meta Categories, and in some instances the use of only one Meta Category may be desirable.

As a simple example of the Meta Category and subcategory selection process, consider the objectives of an organization that invests in simple investment funds, and which is trying to decide in which funds to invest. There are many degrees of freedom from which to select, such as the financial performance of the potential funds, the perceived social value of a given find, the administrative costs to manage the fund, and the like. A first Meta Category can be chosen from this list that focuses on financial performance.

There are many sub-degrees of freedom that can impact this financial performance Meta Category, such as risk, projected rate of return, minimum required cash investment amount, past performance, etc. Any number of these sub-degrees of freedom may be selected to become subcategories, based upon their perceived capacity to impact the financial performance Meta Category. Additional Meta Category and subcategory relationships may also be determined and used.

After identifying and determining the Meta Categories and subcategories that are to be used, surveillance information is collected and assimilated (step 218). A decision is made as to the organization for which the data is to be collected. Market segmentation can be utilized to prioritize which competitive organization to assess first. For example, within the investment fund industry a segmentation structure based on size of funds held, industry sectors represented, or geographic markets of portfolio companies might be utilized. Next, a determination is made of which data source(s) to use, from which the empirical data will be gathered for the analyses (step 220), followed by the actual gathering of the data. Data may be gathered from sources such as, for example, public web sites, secondary market research, public domain documentation, and proprietary information sources.

Once the data is collected, it must be scored (step 222). Objective and subjective data can be scored. For example, objective data can consist of the average dollar value invested in each fund. Subjective data can consist of assessing the perceived social value of the funds.

To score subjective data, a simple point scale can be used. For example, a score of 4 could correspond to "excellent," 3 would be "good," 2 "fair," and 1 "poor." For this investment fund example, the subcategory data could be scored by assigning a value of one to minimal social value, and a four could denote high social value. The average dollar value investment amounts (i.e., the objective data) can later be normalized, as described below. By these objective and subjective scoring methods, a raw score can be obtained (step 224).

The raw scores can be weighted and normalized (step 226). For example, each subcategory can have a weighting factor (step 228). The larger the weighting factor, the more heavily that subcategory is emphasized in the weighted result. If equal weighting is desired between each subcategory, then each subcategory would each use the same weighting factor. The scored value for each subcategory (an output of step 222) is multiplied by its weighting factor and the result becomes its weighted score.

The weighted scores can be normalized (step 228). By way of example, assume the scored subcategories have values of 4, 2, 4, 3, and 1, and that the weighting factor to be applied to each is 1, 2, 5, 1, and 5, respectively. This results in weighted scores of 4, 4, 20, 3, and 5. Each of these weighted scores is divided by the value of the largest weighted score (20, in this example), resulting in normalized scores of 4/20, 4/20, 20/20, 3/20, and 5/20. These fractions simplify to 1/5, 1/5, 1, 3/20, and 1/4, respectively. These normalized values may then be used in this unitary form ("unitary" because the value of the largest subcategory at this point is one), or they may be scaled with a "desired maximum parameter." For example, if the maximum desired subcategory reading was 4, then the desired maximum parameter would have a value of 4. The normalized scores that have been obtained for each subcategory would be multiplied by the desired maximum parameter, yielding values in this case of 4/5, 4/5, 4, 12/20, and 1. Manipulating the scores in this fashion results in the value of the most significant subcategory having a final value that is numerically equivalent to that of the desired maximum parameter (4, in this example). The other subcategories have values smaller than this amount. The method can be used to normalize the results for either weighted or non-weighted subcategory data. The output of this step is the Normalized Score (step 230).

The scores can be presented in different ways. One particularly useful presentation method includes representing the scores on a spider graph (step 232). A detailed example of this graphical method is provided below.

After creating the spider graph (step 232) for a given organization that is being analyzed, a determination can be made as to whether the process should be repeated for additional organizations (step 234). A selection process can be employed when selecting the organization for which data is next to be gathered. For example, market segmentation based on priority or purpose could be useful. The data is then gathered for the selected organization (step 218) and the process repeated.

Once the data has been collected, scored, weighted, and normalized for the subcategories of each of the Meta Categories for the organizations of interest, the data between organizations can be compared. In one embodiment, a complement-type comparative analysis is performed (step 236).

To perform this analysis, the spider graphs representing selected Meta Categories for Organization 2 are superimposed over the spider graphs representing the corresponding Meta Categories for Organization 1 on the same set of axes (step 240). With proper coloring, shading, or the like, this process can be performed simultaneously for a plurality of organizations. Using this technique, the areas of corresponding strength between the two organizations are compared and/or contrasted.

In another embodiment, a "difference" analysis (step 238) can be performed, where differences in subcategory measurements are contrasted between different organizations. Prior to performing the difference calculation, the method of steps 210 through 234 is performed as described above. The difference in corresponding subcategory values is then calculated and displayed on Meta Category spider graphs (step 242). The subcategory areas in which Organization 1 has greater capability than Organization 2, and the converse, can be seen. In this embodiment, the objective is to emphasize the areas in which one organization has superior capabilities compared to the other.

In any embodiment the process can be applied offensively or defensively, by highlighting business opportunities or vulnerabilities.

Figure 3:
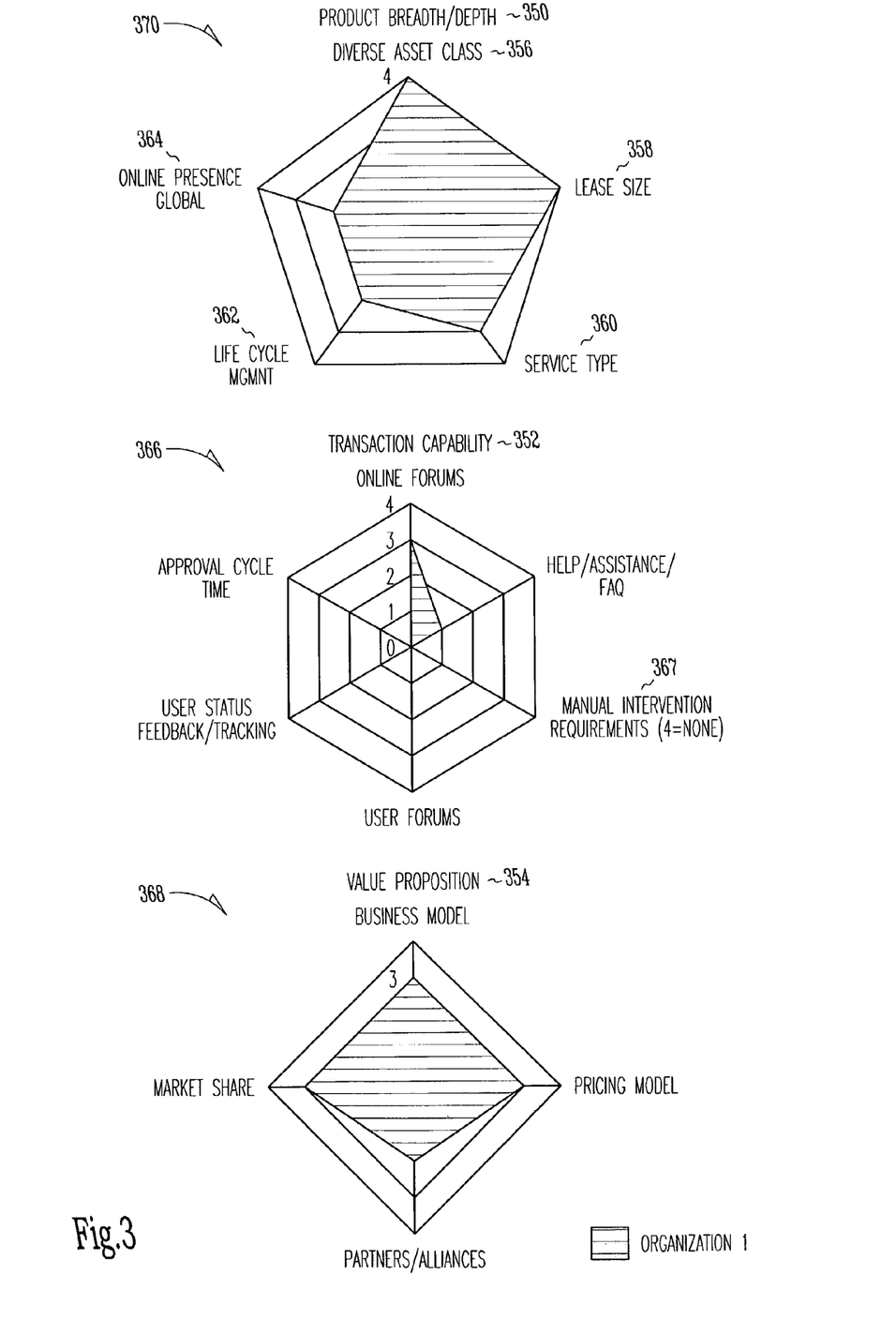
FIG. 3 depicts a graphical representation of the results of the method of FIG. 1 for a hypothetical organization.

FIG. 3 depicts a graphical representation of the results of the method of FIG. 2 for a hypothetical organization. This example is drawn to a leasing company. Three Meta Categories have been selected for this example: Product Breadth/Depth 350, Transaction Capability 352, and Value Proposition 354. These Meta Categories represent key objectives that drive the value creation goals of this business organization. They have been selected in accordance with steps 210 and 212 of the method of FIG. 2.

An examination of the Product Breadth/Depth graph 370 also reveals the subcategories that have been selected for this Meta Category. Specifically, examples of the subcategories chosen as having the most impact on Product Breadth/Depth include Diverse Asset Class 356, Lease Size 358, Service Type 360, and Life Cycle Management 362. Their selection could have been based on "as-is" and/or "should-be" strategic objectives. The Product Breadth/Depth Meta Category graph 370 shows that these subcategories are each represented as an axis of the graph. Another illustration of Meta Category/subcategory relationships is shown for the Transaction Capability Meta Category 352 in the Transaction Capability graph 366, utilizing subcategories of Online Forms, Help/Assistance/FAQ, Manual Intervention Requirements, User Forums, etc. The information on the Value Proposition graph 368 has been configured in a similar manner. It will be apparent to those knowledgeable in the business management and consulting art that the subcategories selected in these examples each are significant drivers of value with regard to the Meta Category with which they have been associated. These graphs also illustrate how the number of subcategories selected may vary for different Meta Categories. The above methodology may be repeated for any number of Meta Categories. It is not necessary to limit the evaluation technique to only three Meta Categories, and in some instances the use of only one Meta Category may be desirable.

In the present example, three market segments could be considered: the top 12 traditional leasing companies, the top 12 new entrants in the leasing industry, and the top 12 equipment manufacturer services markets. Thus, based on the selected market segmentation, a set of Meta Category spider graphs could be generated that is based upon data collected from the traditional leasing companies. A second set of Meta Category spider graphs could be generated based upon data collected for the new entrants, and so on.

The graphical values represented on FIG. 3 were obtained by the method shown in FIG. 2 and described above. Data was gathered from various sources and scored. The lease size subcategory 358 value is a result of scoring objective data, and was determined by combining the number of on-line leases each in the price range of $150K-$250K, $250K-$1M, $1M-$5M, and $5M-$100M. The numbers combined for each lease size range were totaled. A unit count was performed in each lease size range, counting the number of leases that qualified, and the results were weighted and normalized by the methods described above. Subjective data results are also displayed. For example, the Manual Intervention Requirements subcategory 367 of the Transaction Capability Meta Category graph 366 resulted from the processing of subjective data, using the methods discussed above. The score results for these graphs were obtained by the method of FIG. 2, corresponding to step 224 of FIG. 2.

The raw scores were weighted and normalized (step 226), yielding the numerical values displayed in FIG. 3. For this example the scores represented on the Product Breadth/Depth graph 370 and the Transaction Capability graph 366 have each been normalized to a desired maximum parameter value of 4.

After creating the spider graph for Organization 1, a determination needs to be made as to whether the exercise should be repeated for additional organizations. The next organization to be measured can be chosen based upon market segmentation priorities or purposes, as described above. The results for Organization 2 are presented in FIG. 4.

Figure 4:
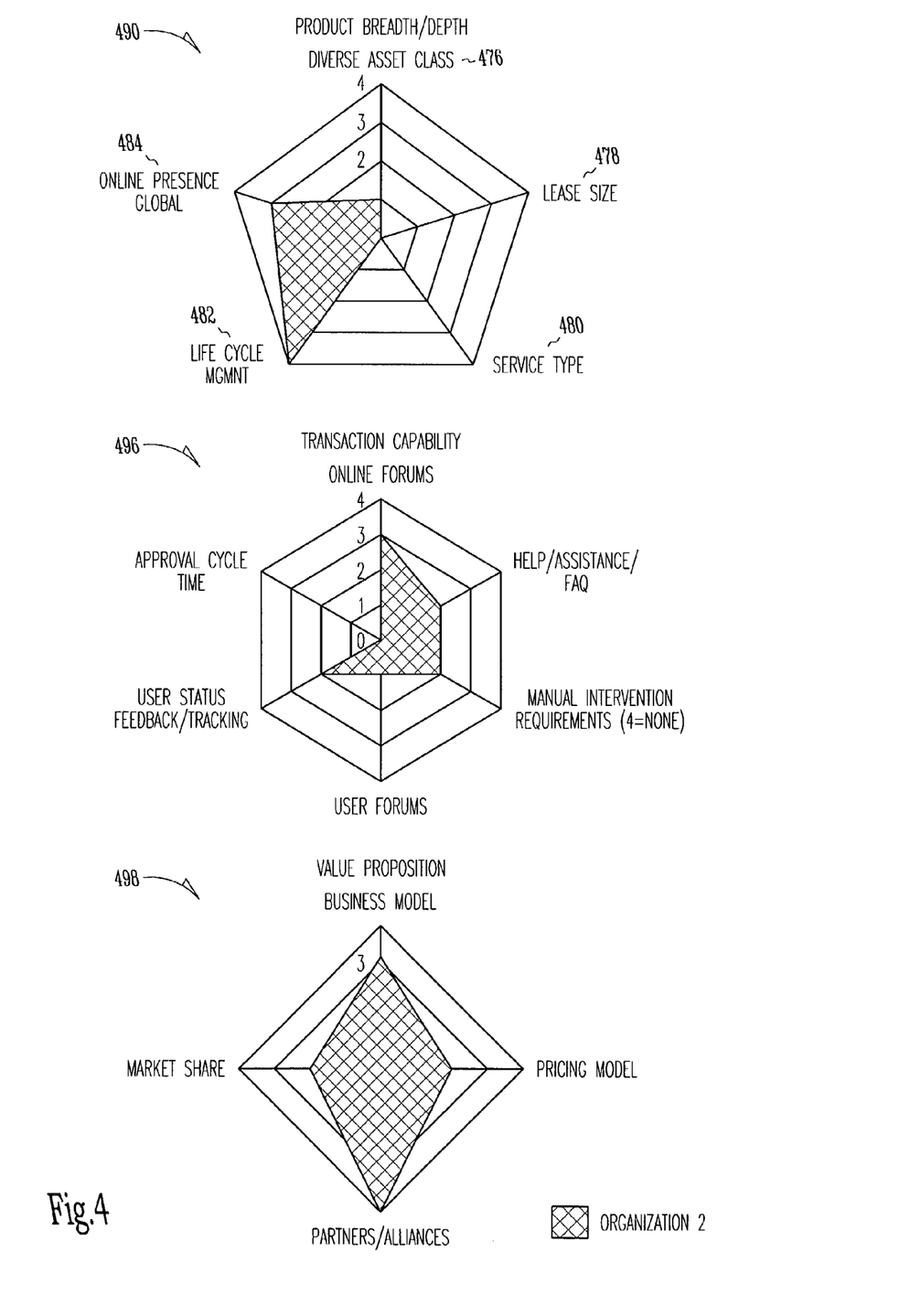
FIG. 4 depicts a graphical representation of the results of the method of FIG. 1 for another hypothetical organization.

FIG. 4 depicts a graphical representation of the results of the method of FIG. 2 for Organization 2. The method followed to obtain these results parallels what was described above.

Figure 5:
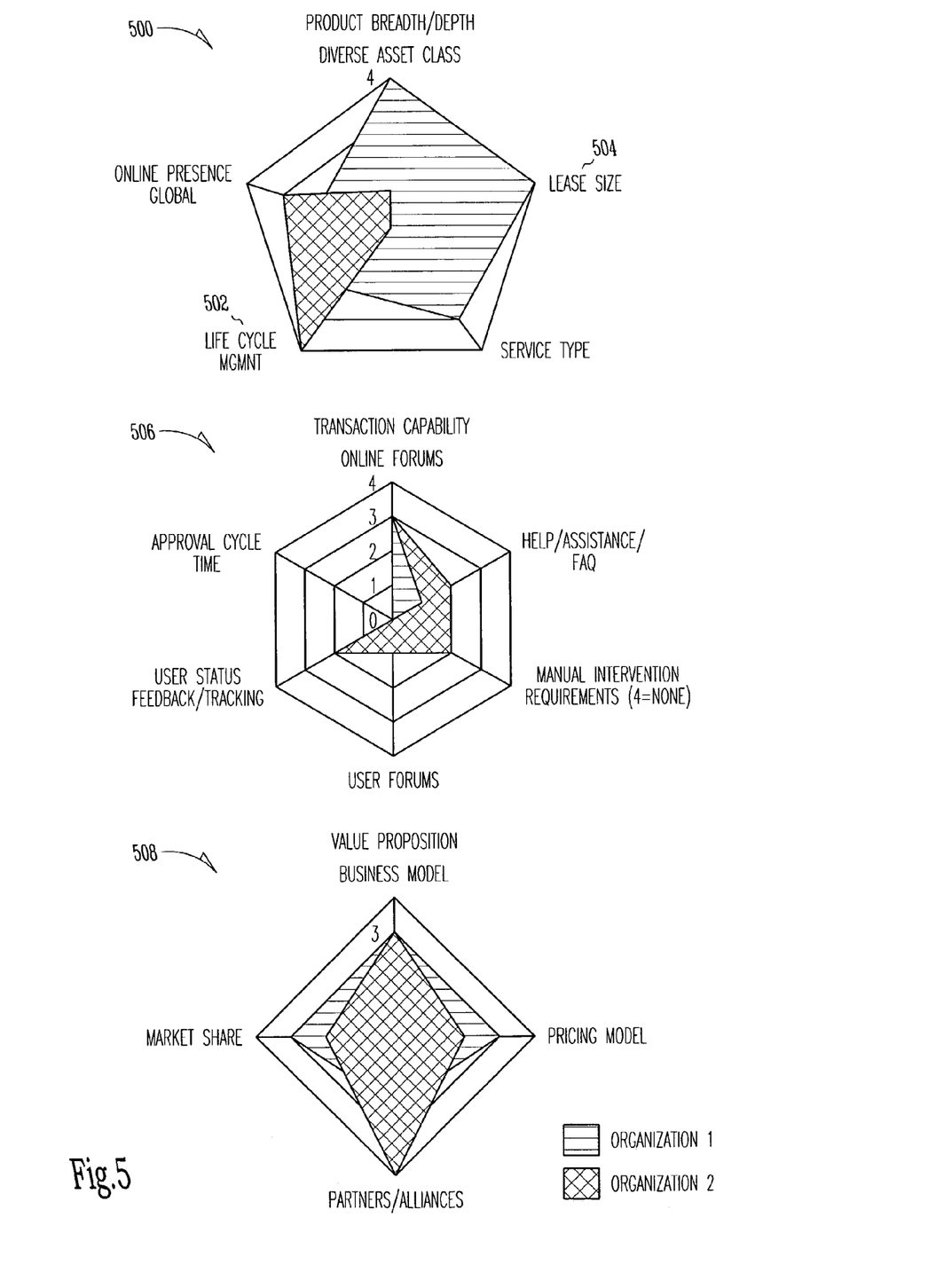
FIG. 5 illustrates one method in which the results of FIGS. 2 and 3 can be combined to present the results in a useful summary form.

FIG. 5 illustrates one method in which the results of FIGS. 3 and 4 may be combined to present the results in a useful summary form. In this embodiment, the data values of different organizations can be compared, as a complement-type comparative analysis (step 236). The Meta Category and subcategory selections of both FIGS. 3 and 4 correspond to each other and a comparable scaling algorithm was used for each. Thus, the complementary graphical analysis for Organizations 1 and 2 can be performed and is shown in FIG. 5. This was obtained by superimposing the spider graphs representing selected Meta Categories for Organization 2 over the spider graphs representing the corresponding Meta Categories for Organization 1, on the same set of axes (step 240). With proper coloring, shading or the like this process can be performed simultaneously for a plurality of organizations, although only two are illustrated in this example. Using this technique, the areas of corresponding strength between the two organizations can be rapidly and effectively compared.

For example, with respect to the Product Breadth/Depth Meta Category, it is readily apparent that Organization 2 possesses more strength in the Life Cycle Management subcategory 502 of this Meta Category than Organization 1. Conversely, the results show that Organization 1 has more strength in the Lease Size subcategory 504 than Organization 2. The same approach is illustrated by the Transaction Capability Meta Category spider graph 506 of FIG. 4. As shown, Organization 1 is severely limited in the number of subcategory functions it can perform or fulfill, while Organization 2 has established capability in five of the six subcategories that were determined to be important with respect to the Transaction Capability Meta Category. Although considering the characteristics of the Product Breadth/Depth Meta Category spider graphs of each individual organization would allow each of these observations to be made, the comparative representation illustrated by the figure more readily enables a business analyst or manager to effectively perform complex comparisons in an efficient manner.

There are several ways in which these comparative representations may be visually analyzed. As discussed above, one technique involves comparing the magnitude of a given measurement on a subcategory axis between organizations, and another technique involves comparing the relative balance between the values on the graph axes. Yet another technique involves evaluating the relative amount of coverage area displayed. For example, the coverage area of Organization 1 shown in the Product Breadth/Depth Meta Category graph 500 illustrates that Organization 1 has comparatively comprehensive coverage with regard to the subcategory factors that were determined to be important with reference to this Meta Category, since most of the surface of the graph is covered. Although Organization 2 has some strengths, it is apparent that its overall balance and coverage capability is lacking.

In another embodiment, the subcategories could represent undesirable or unfavorable information. In such a situation, an evaluation of the visual surfaces presented would reflect this by giving preference to the smaller graphical coverage areas displayed, since these smaller areas would be indicative of the smaller values obtained for the unfavorable measurement criteria used. Other permutations of the method are also possible and are considered to be within the scope of the invention.

Figure 6:
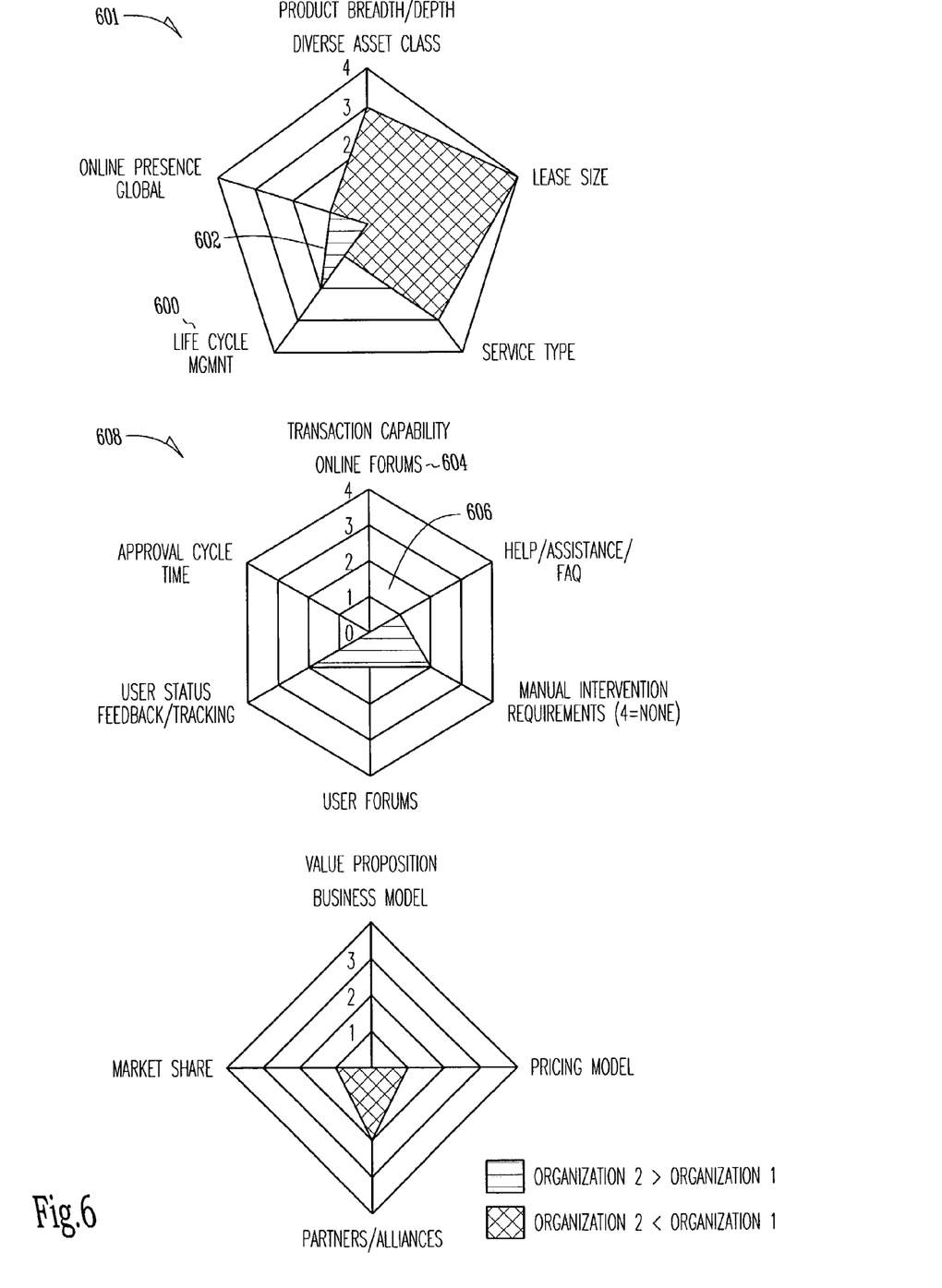
FIG. 6 shows how a graphical representation of a difference analysis can be used to illustrate the outcome of the method of this invention.

FIG. 6 shows how a graphical representation of a difference analysis may be used to illustrate the outcome of the method of this invention (step 238). In this embodiment, differences in the subcategory measurements of different organizations are emphasized. Prior to performing the difference calculation, the method of steps 210 through 234 is carried out as described above.

The objective of the difference analysis is to highlight specific areas in which one organization has superior capabilities compared to another. Making a determination of the areas in which one organization performs better than another is of interest and value in making management decisions. The result of such a comparison is illustrated in FIG. 6. Even though an organization has generally broad subcategory coverage within a Meta Category, there may be narrow areas of comparative strength within a subcategory possessed by a competing organization. These pockets of strength can be indicative of the existence of a possible value-creating opportunity. A desirable opportunity may be realized, for example, by forming a strategic licensing arrangement, or by some other means that provides access to that portion of the other organization's capabilities. By obtaining access to this portion of the capability of the other organization, the value creation capabilities of both organizations may be increased. However, without the comparison process of the present invention the opportunity can go unnoticed and the net potential value to both organizations would not be realized.

For example, turning to the Life Cycle Management subcategory 600 of the Product Breadth/Depth Meta Category graph 601, the small area 602 of this spider graph shows a section where the capabilities of Organization 2 exceed those of Organization 1. Even though Organization 1 has reasonable capability in this area, the increased capability of Organization 2 in this specific area 602 indicates that acquisition of that portion of Organization 2 by Organization 1 should be considered as a potential strategic objective. Acquiring this specific capability of Organization 2 would serve to better round out the capabilities of Organization 1 with regard to the Product Breadth/Depth Meta Category.

Considering the Online Forms subcategory 604 of the Transaction Capability Meta Category, it is apparent from the Transaction Capability Complementary Analysis spider graph 506 (see FIG. 5) that both organizations have capability in the area of this subcategory. The lack of distinction shown in area 606 of the Transaction Capability difference graph 608 indicates there is little reason for either organization to consider a strategic alliance, license, or takeover based on this portion of the business process. It can be seen that taken as a whole, these graphs represent which Meta Categories and subcategories present potential strategic opportunities for one organization, or potential vulnerabilities for the other.

In each embodiment as described above, the invention can be applied offensively or defensively, by highlighting business opportunities or vulnerabilities. It can be utilized by the business manager or analyst to make comparisons and draw conclusions regarding competitors or potential strategic partners, and regarding business combination strategies and alliances. The invention is also useful for performing internal analyses to enable the effective refinement of the competitive approach of a business organization by focusing on internal business processes or core competencies. In the types of situations described, this invention presents a useful and valuable technique for the analysis and comparison of business information.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for converting business data into business information, comprising:

identifying, from a user interface, one or more meta categories corresponding to investment data, wherein the one or more meta categories correspond to a particular investment fund's financial performance and includes a metric for financial performance of a particular fund including average dollar value invested;

determining, from the user interface, one or more subcategories within each meta category that is associated with an industry segment for the fund, wherein each subcategory include a factor that directly impacts the metric and includes perceived social value of the fund mapped to a scale of 4 for excellent perceived social value, 3 for good perceived social value, 2 for fair perceived social value, and 1 for poor perceived social value size of funds;

computing, within a processor, a score for each subcategory by selecting data sources to analyze using the meta categories and the subcategories and the corresponding metrics and factors found in those data sources to map to a scale for each score, wherein the data sources are selected from one or more of the following: public web sites, secondary market research, public domain documentation, and proprietary information sources, and wherein the score computed by combining the average dollar value invested in the fund with the perceived social value mapped to the scale;

repeating the processing associated with identifying, determining, and computing for one or more additional funds to produce one or more additional scores; and generating, within a processor, a multidimensional graphical representation of the score and the one or more additional scores for each subcategory of each meta category, and wherein the multidimensional graphical representation of the score is identified within a presented graph and the presented graph includes a labeled axis for each subcategory and each subcategory represents a particular dimension, and wherein the multidimensional graphical representation is produced by superimposing the score and additional scores for the particular fund and the one or more additional funds on the labeled axis thereby visually depicting within the graph values for the average dollar value invested and the perceived social value for the particular fund in relation to the average dollar values invested and the perceived social values for the one or more additional scores associated with the one or more additional funds.

2. The method of claim 1, wherein computing the score includes weighting and normalizing the score for each subcategory.

3. The method of claim 1, wherein generating the multidimensional graphical representation comprises generating a spider graph.

4. The method of claim 1, wherein the computing includes using both publicly and privately-available data to compute the score.

5. The method of claim 1, wherein the computing step includes using subjective data to compute the score, wherein subjective data is supplied by a user via the user interface and maps to a predefined numeric scale, and wherein the perceived social value is the subjective data and the scale is the numeric scale.

6. A method for converting business data into business information, comprising:

identifying, within a user interface, one or more meta categories corresponding to financial data associated with organizations within a particular industry segment, wherein the one or more meta categories correspond to metric for financial performance of a particular fund of a particular organization and includes average dollar value invested;

determining, within the user interface, one or more subcategories within each meta category, wherein each subcategory include a factor that directly impacts the metric and includes perceived social value of the fund mapped to a scale of 4 for excellent perceived social value, 3 for good perceived social value, 2 for fair perceived social value, and 1 for poor perceived social value size of funds;

computing, within a processor, scores for the particular organization and for other organizations within the industry segment by acquiring values for the average dollar value invested from publicly and privately acquired data sources and by acquiring values for the perceived social value from a user, each score having a value for the average dollar value associated with the meta categories and a value for the perceived social value associated with the subcategories; and generating a multidimensional graphical representation that visually depicts the scores together on the multidimensional graphical representation and identifies with the scores the particular organization and the other organizations and their scores relative to one another within the multidimensional graphical representation and presenting the multidimensional graphical representation to the user.

7. The method of claim 6, wherein computing the score includes weighting and normalizing the score for each subcategory.

8. The method of claim 6, wherein the multidimensional graphical representation is a spider graph.

9. A system for converting business data into business information, comprising:

a user interface, for inputting financial data including an financial product, a financial segment, an average dollar amount invested for the financial product, and a perceived social value for the financial product mapped to a scale where 4 indicates a perceived excellent social value rating, 3 represents a perceived good social value rating, 2 represents a perceived fair social value rating, and 1 represents a perceived poor social value rating;

a memory in communication with the user interface, for storing the financial data for a plurality of organizations within the financial segment and which are entered via the user interface; and a processor in communication with the memory for manipulating the financial data, the processor computing scores for each of the plurality of organizations, each score having a value for the average dollar amount invested and a value for the perceived social value and generating a multidimensional graphical representation of the scores and including within the multidimensional graphical representation multiple axes for a presented graph, wherein one axis is associated with the values for the average dollar amounts invested and another axis is associated with the values for the perceived social values and each organization identifiable within the graph with their corresponding values for the average dollar amounts invested and for the perceived social values.

10. The system of claim 9, wherein the user interface comprises a monitor and a keyboard.

11. The system of claim 9, wherein the multidimensional graphical representation generated by the processor is displayed on a monitor.

12. The system of claim 9, wherein the processor weights and normalizes each of the scores before presenting in the graph.

13. The system of claim 9, wherein the processor generates a spider graphical representation of the scores.

14. An apparatus for converting business data into business information, the apparatus comprising:

a first device for identifying a meta category corresponding to financial data for a plurality of organizations each having a financial product, the meta category identifying an average dollar amount invested in the financial product for each of the organizations;

a second device for determining a subcategory corresponding with the meta category, wherein the subcategory identifies a perceived social value for the financial product for each of the organizations and mapped to a pre-defined scale;

a third device for computing scores for each of the meta categories and subcategories of each of the organizations, each score including the corresponding average dollar amount invested in the financial product and the perceived social value associated with the financial product, and wherein data sources are selected to provide at least some of the values associated with the average dollar amounts invested and the perceived social values; and a fourth device for generating a multidimensional graphical representation of the scores, and wherein the fourth device is for producing a graph that represents the multidimensional graphical representation and the graph includes a unique axis for each unique average dollar amount invested and perceived social value, and wherein the multidimensional graphical representation is produced by superimposing portions of the scores onto selective ones of the unique axes.

15. The apparatus of claim 14, wherein the third device weights and normalizes the scores.

16. The apparatus of claim 14, wherein the fourth device generates a spider graph.

17. The apparatus of claim 14, wherein the apparatus uses one of a complementary analysis technique or a differences analysis technique to present the scores for the plurality of organizations within the graph.

* * * * *